D. KLEIN.
PONTON-BRIDGE.
No. 7,116. Reissued May 16, 1876.
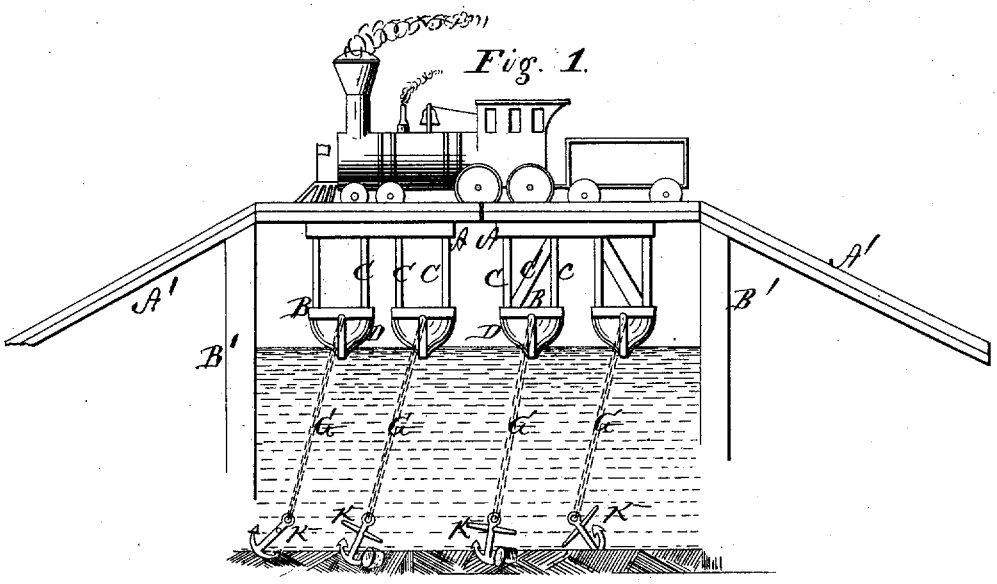
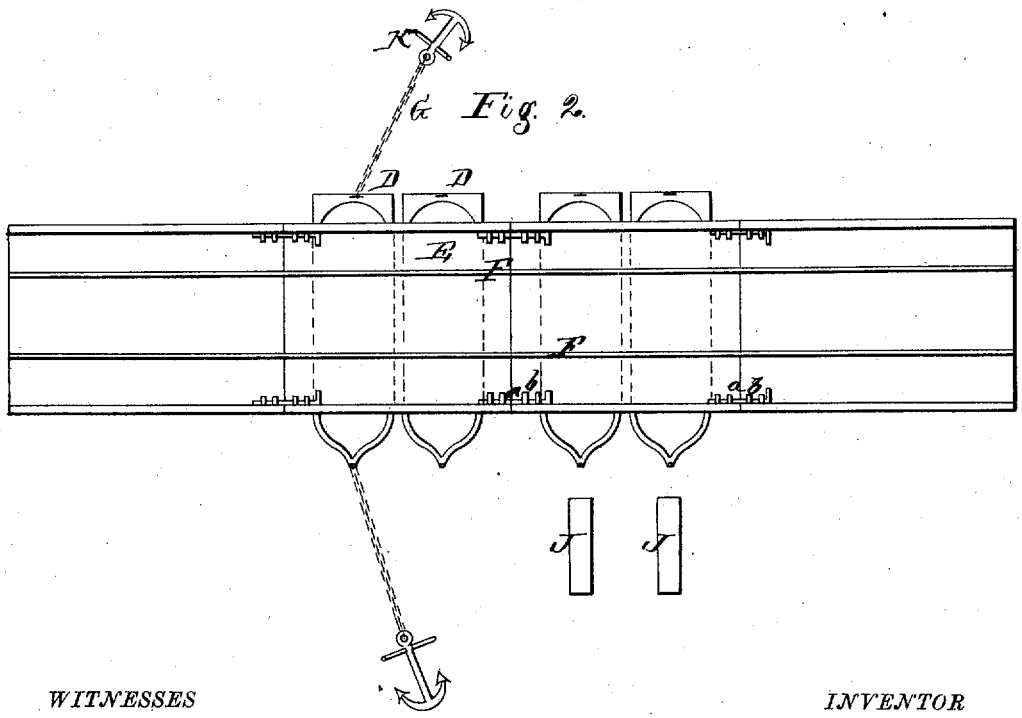
WITNESSES
H. Aubrey Coulmin
C. L. Ewert
INVENTOR
David Klein.
By Alexander S. Mason
Attorneys.
N. PETERS, PHOTO-LITHOGRAPHER, WASHINGTON, D. C.

UNITED STATES PATENT OFFICE.

DAVID KLEIN, OF NEW YORK, N. Y.

IMPROVEMENT IN PONTON-BRIDGES.

Specification forming part of Letters Patent No. 147,775, dated February 24, 1874; reissue No. 7,116, dated May 16, 1876; application filed March 6, 1876.

*To all whom it may concern:*

Be it known that I, DAVID KLEIN, of New York, in the county of New York and State of New York, have invented certain new and useful Improvements in Ponton-Bridges; and I do hereby declare that the following is a full, clear, and exact description thereof, references being had to the accompanying drawings, and to the letters of reference marked thereon, which form a part of this specification.

The nature of my invention consists in the construction and arrangement of a railway ponton-bridge, as will be hereinafter more fully set forth.

In the annexed drawings, Figure 1 is a side elevation, and Fig. 2 a plan view, of my invention.

My bridge is made in sections, of any suitable number and length, according to the length of the bridge desired, and may be built above the surface of the water from one to thirty feet in height, or more, and it may be built on the deepest water without being necessary to build any piers.

The end sections A′ A′ are made stationary, and, if necessary, more or less inclined, and rest upon piers or supports B′ B′, built in any of the known and usual ways. The intermediate sections are each supported upon boats D, each of which has cross-beams B laid on top of and secured to it. From these cross-beams extend vertical posts or pillars C, which support the top beams A, as shown. These beams and posts or pillars are rigidly secured together, and the pillars braced by one or more braces, C′, if desired. The top beams A A support the floor-sections E E of the bridge, which are united together by means of bolts *a*, passing through loops *b*, as shown in Fig. 2. The boats D are anchored at both ends by means of anchors K and chains or cables G, which latter should be wound upon suitable windlasses, to accommodate them to the ebb and flow of the tide.

In the construction of the bridge the pillars C may be multiplied according to the strength required, and are fastened together by the braces C′, which are iron bars attached by bolts.

This ponton-bridge is prevented from moving by the chains, anchors, and windlasses described.

The whole bridge is provided with suitable railings and divisions, to divide the foot-paths on each side from the center portion of the bridge, where railroad-tracks F are laid for the passage of cars.

Any section of the bridge may be removed to allow vessels to pass up and down, and said section is easily returned in position. Such section will be worked by a suitable engine and chains.

J J are ice-breakers, either attached to the ponton or separate, to protect the bridge during the winter season.

This bridge is also intended for military purposes, for carrying munitions of war and cavalry, and each section so made as to be towed from one place to another; and the different sections can be easily transported to any point where needed; and the bridge can easily be put up and taken down, in a very short time, by common laborers without the aid of skilled engineers.

Having thus fully described my invention, what I claim as new, and desire to secure by Letters Patent, is—

A floating bridge constructed in sections, each section consisting of one or more boats, provided with standards at each end, connected at the top by beams, and supporting a section of the crossing, which sections are secured by rigid connections, all the parts being combined and operating as set forth.

In testimony that I claim the foregoing I have hereunto set my hand this 4th day of March, 1876.

D. KLEIN.

Witnesses:
H. A. HALL,
C. L. EVERT.